(12) United States Patent
Arcella et al.

(10) Patent No.: US 6,902,676 B2
(45) Date of Patent: Jun. 7, 2005

(54) POROUS HYDROPHILIC MEMBRANES

(75) Inventors: Vincenzo Arcella, Milan (IT); Alessandro Ghielmi, Milan (IT)

(73) Assignee: Ausimont S.p.A., Milan (IT)

( * ) Notice: Subject to any disclaimer, the term of this patent is extended or adjusted under 35 U.S.C. 154(b) by 316 days.

(21) Appl. No.: 10/080,699

(22) Filed: Feb. 25, 2002

(65) Prior Publication Data
US 2002/0144944 A1 Oct. 10, 2002

(30) Foreign Application Priority Data
Feb. 26, 2001 (IT) .................................... MI2001A0384

(51) Int. Cl.[7] .......................... B01D 29/46; B01D 39/00; B01D 61/00; C02F 1/44
(52) U.S. Cl. ........................ 210/640; 210/490; 210/640; 210/500.36; 210/650; 96/4; 264/41; 427/244; 427/245
(58) Field of Search .......................... 210/500.36, 490, 210/640, 650, 651; 96/4; 264/41; 427/244, 245

(56) References Cited

U.S. PATENT DOCUMENTS

| | | | |
|---|---|---|---|
| 4,035,565 A | 7/1977 | Apotheker et al. | 526/249 |
| 4,243,770 A | 1/1981 | Tatemoto et al. | 525/331 |
| 4,564,662 A | 1/1986 | Albin | 526/247 |
| 4,694,045 A | 9/1987 | Moore | 525/276 |
| 4,745,165 A | 5/1988 | Arcella et al. | 526/247 |
| 4,943,622 A | 7/1990 | Naraki et al. | 526/206 |
| 5,082,472 A * | 1/1992 | Mallouk et al. | 95/49 |
| 5,173,553 A | 12/1992 | Albano et al. | 526/238 |
| 5,599,614 A | 2/1997 | Bahar et al. | 442/171 |
| 5,928,792 A | 7/1999 | Moya | 428/422 |
| 6,110,333 A * | 8/2000 | Spethmann et al. | 204/252 |
| 6,149,810 A * | 11/2000 | Gonzalez-Martin et al. | 210/321.84 |
| 6,179,132 B1 * | 1/2001 | Moya | 210/490 |
| 6,468,657 B1 * | 10/2002 | Hou et al. | 428/403 |
| 6,625,104 B2 * | 9/2003 | Michimori et al. | 369/215 |

FOREIGN PATENT DOCUMENTS

| | | |
|---|---|---|
| EP | 0 136 496 | 4/1985 |
| EP | 0 199 138 | 10/1986 |
| EP | 0 410 351 A1 | 1/1991 |
| EP | 1 004 615 A2 | 5/2000 |
| WO | WO 97/40924 | 11/1997 |
| WO | WO 99/38897 | 8/1999 |
| WO | WO 00/61267 | 10/2000 |

* cited by examiner

Primary Examiner—Ana Fortuna
(74) Attorney, Agent, or Firm—Arent Fox PLLC

(57) ABSTRACT

Porous hydrophilic membranes comprising a porous inert support on which an ionomer is deposited, said membranes being characterized in that they have a water permeability higher than 1 l/(h.m$^2$.Atm).

27 Claims, 3 Drawing Sheets

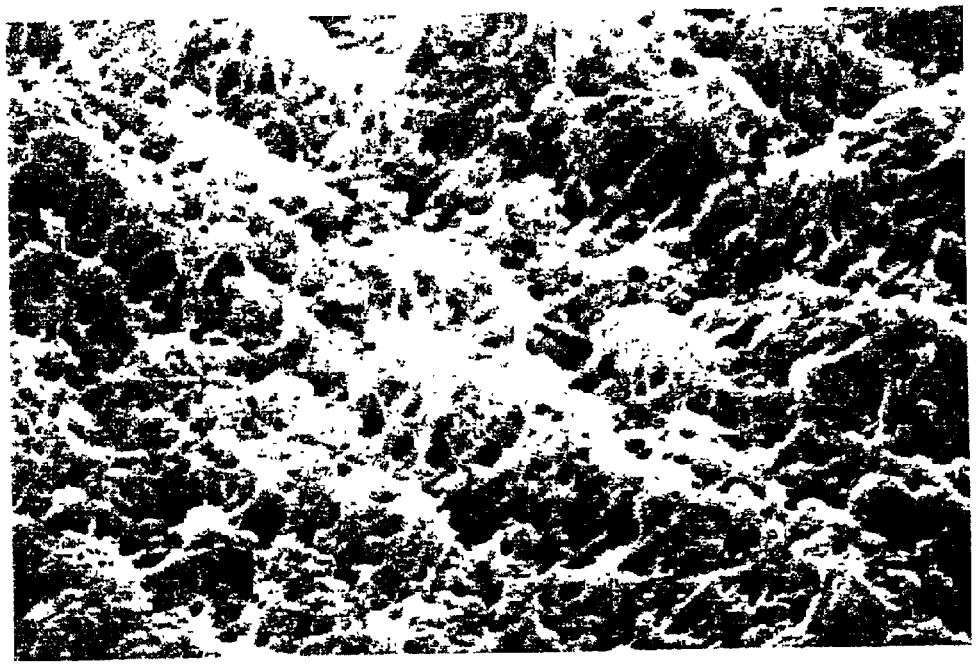
Fig. 1A
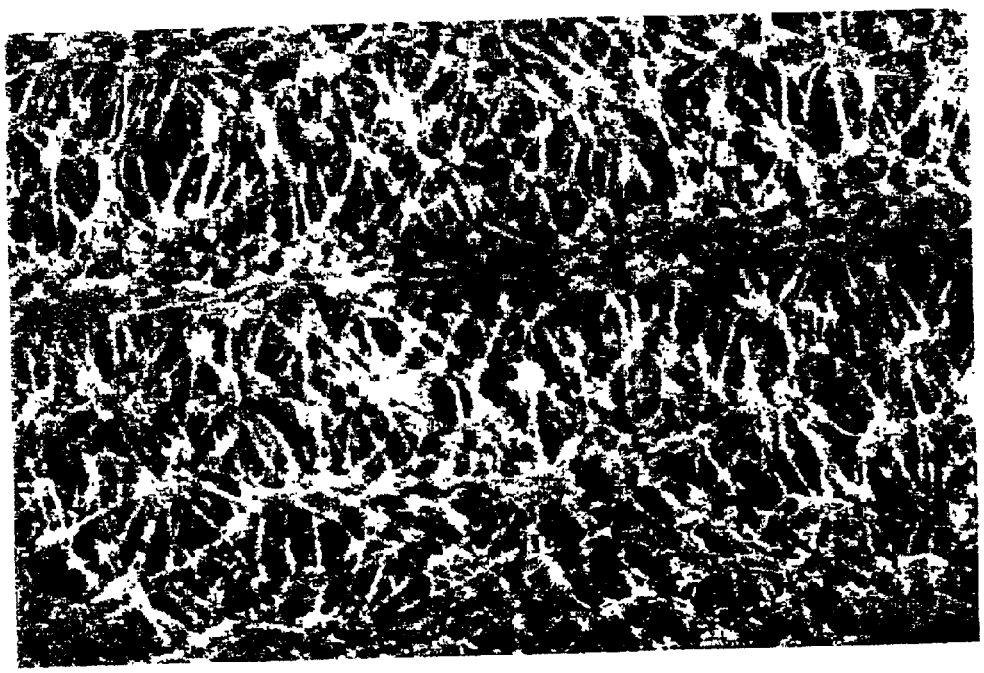
Fg. 1B

POROUS HYDROPHILIC MEMBRANES

The present invention relates to hydrophilic porous membranes and a process for preparing them, said membranes having a high water permeability, being easily wettable by water, and in the wet state they show a much lower gas permeability than the not wetted membrane.

More specifically the membranes of the present invention comprise an inert porous support, preferabaly based on fluorinated polymers comprising a fluorinated ionomer, preferably having —SO$_3$H functions.

The membranes of the invention, being characterized by a high water permeability, are particularly suitable to the use in separation processes, for example microfiltration, ultrafiltration and iperfiltration processes of aqueous solutions, in pervaporation processes for example to dehydrate wet gases.

It is known that the membranes at present used in separation processes are based on hydrogenated polymers. The drawback of these membranes is that they are difficult to be cleaned and to be regenerated once used. Besides it is well known that the ultrafiltration membranes when used in the medical field, for example for dialysis, must have as an essential feature the absence of release of harmful substances. Besides said membranes must be easily sterilizable without degradation. To overcome these drawbacks it is known in the prior art to use membranes based on fluorinated polymers, for example PVDF (polyvinyledene fluoride) or PTFE (polytetrafluoroethylene), obtained by specific processes to obtain the necessary porosities. However, due to the high hydrophobicity of these materials, especially in the PTFE case, the water permeability is extremely reduced. To increase the water permeability it is known to carry out surface treatments of the membranes to reduce the material hydrophobicity. However even with these surface treatments the membranes show a low water permeability.

Furthermore said treatments confer to the membrane a temporary hydrophilicity. This means that when the membrane dehydrates, it looses the hydrophilic properties (the so called dewetting phenomenon) and it is necessary to repeat the complex treatment to render the membrane hydrophilic.

At this purpose see U.S. Pat. No. 6,179,132, wherein a porous membrane for filtration is described; it comprises a porous perfluoropolymer substratum having the surface completely modified by a perfluorocarbon copolymer directly bound to the substratum, the perfluorocarbon copolymer having hydrophilic groups directly wettable at contact with water. In said patent it is stated that the perfluoropolymer surface is rendered hydrophilic without compromising the substratum inertia and without meaningfully decreasing the substratum porosity. The copolymer is deposited on the perfluoropolymer from a substantially aqueous solution to obtain a perfluoropolymer surface directly wettable with water. This directly wettable surface modified according to the process described in said patent differs from the surfaces described in the prior art treated with perfluorocarbon polymers, deposited from a solution of water and an organic solvent or of an organic solvent alone, since the surfaces are not directly wettable at contact with water. Besides the above surfaces modified according to the prior art require a complex pretreatment (organic solvent or shear) to allow the surface wetting with water. The porous membranes of said patent do not show the dewetting phenomenon. The support surface according to said patent is not coated by a coating but it is only modified.

Said membranes show water permeability, however this is not sufficiently high for the use in the filtration field as required in this sector (see comparative Examples)

Also in the pervaporation processes the membranes used to dehydrate wet gases must show high water permeability and a low permeation to gases when they come into contact with humid gases. For these applications the Nafion®-based membranes are used. However the drawback of these membranes is the low water permeability. Therefore the industrial plants require membranes having a high surface and consequently they must have large sizes. This represents a drawback from both the industrial and economic point of view.

The need was felt to have available hydrophilic membranes having an improved water permeability without showing the dewetting phenomenon with respect to the membranes of the prior art.

It has been surprisingly and unexpectedly found by the Applicant that it is possible to solve the above technical problem by the membranes described hereinafter.

An object of the present invention are porous hydrophilic membranes comprising a porous inert support on which an ionomer is deposited, said membranes being characterized in that they have a water permeability higher than 1 l/(h.m$^2$.Atm), preferably higher than 10 l/(h.m$^2$.Atm), more preferably higher than 100 l/(h.m$^2$.Atm), still more preferably higher than 500 l/(h.m$^2$.Atm); the ionomer being under amorphous form and having the hydrophilic group in the acid form.

The water permeability is determined according to the following test: the membrane is placed on a metal plate having a diameter of 36 mm, with holes having a diameter of 0.5 mm and permeability higher than 500,000 l/(h.m$^2$.Atm), placed at the base of a vertical cylinder; 130 ml of deionized and distilled water are poured into the metal cylinder; the cylinder is closed and the internal pressure is regulated by feeding nitrogen, carrying out 4 permeation experiments at the pressures of 0.5, 1, 1,5 and 2 Atm, respectively, maintaining the pressure constant during each experiment and operating so that at the end a water head remains above the membrane; the flow-rate and then the flow for each pressure value are determined; the water volume collected for time unit and for membrane surface unit and for pressure unit is determined. Then the obtained flows and the corresponding pressures are reported in a diagram and it is determined the slope of the straight line (which represents the permeability) passing through the diagram origin point which gives the minimum mean square deviation with respect to the experimental points. The used membranes are bistretched PTFE-based Goretex® having a porosity of 0.2 microns (pore average size), a thickness of 40 microns, commercialized by Gore® Germany, the membrane is treated according to the process of U.S. Pat. No. 6,179,132 or according to the process of the present invention or of the comparative Examples, the membrane having a thickness of about 40 microns.

It has been found by the Applicant that on the inert porous supports of the invention the ionomer is distributed under the form of coating on the external surfaces and on the inner walls which define the membrane interstices. S.E.M photographies show that the support porous structure even after the treatment according to the present invention remains substantially unchanged when the ionomer amount forming the coating is lower than about 20% by weight (see FIGS. 1A, 1B and 3A). When a membrane uses as a support a bistretched PTFE, the ionomer places itself uniformly and homogeneously on all the single fibrils and knots forming the support structure.

Depending on the kind of filtration, it can be useful to control the membrane porosity, for example to control the cut-off thereof. Therefore the porous membranes of the invention can have the pores partially or totally occluded to gases when the membrane is not wetted, provided that there is a water permeability value higher than the above limit. The gas occlusion entity depends on the ionomer amount deposited on the support. The gas occlusion is determined according to ASTM 0726-58 and is expressed as Gurley number. When the Gurley number is higher than 10,000 the membrane when it is not wetted is totally occluded to gases.

To obtain porous membranes with pores completely occluded to gases, the membrane must contain an ionomer amount higher than about 30% by weight with respect to the weight of the membrane (support+ionomer).

The porous membranes with partially occluded pores to gases contain an ionomer amount lower than about 20% by weight. The minimum amount of ionomer which can be used for the membranes partially occluded to gases can also be very low, even of the order of about 0.5% by weight.

Membranes having a very high permeability contain a deposited ionomer amount from 0.5 to 10% by weight (support+ionomer).

The Applicant has found that between 20% and 30% by weight of ionomer it is possible to find membranes both partially and totally occluded to gases. According to a not binding theory this zone could be defined a transition zone.

It has been found that porous membranes not completely occluded to gases, when not wetted, appear opaque. It has been surprisingly found that said membranes at contact with water become much more transparent than those described in the prior art and they show a much lower permeability to gases with respect to when they are opaque.

As porous support, any porous inert material able to give the membrane the suitable mechanical properties can be used. More preferably a porous support based on (per)fluoropolymers is used for their high chemical inertia, still more preferably, porous membranes of PTFE, preferably bistretched, are used.

The ionomers are (per)fluorinated polymers, preferably having —$SO_3H$ and/or —COOH functionality, preferably —$SO_3H$, and an equivalent weight such as to result amorphous. The preferred ionomers comprise:

(A) monomeric units deriving from one or more fluorinated monomers containing at least an ethylene unsaturation;
(B) fluorinated monomeric units containing functional groups transformable into hydrophilic groups, preferably —$SO_2F$ and/or —COOR, —COF, wherein R is a $C-C_{20}$ alkyl radical or a $C_6-C_{20}$ aryl radical, in such an amount to give the above equivalent weight, the functional groups being converted into hydrophilic groups, preferably into —$SO_3H$ and/or —COOH groups in the final membrane when the functional groups were —$SO_2F$ and/or —COOR, —COF.

Preferably the fluorinated monomers of type (A) are selected from:
vinylidene fluoride (VDF);
$C_2-C_8$ perfluoroolefins, preferably tetrafluoroethylene (TFE);
$C_2-C_8$ chloro- and/or bromo- and/or iodo-fluoroolefins, such as chlorotrifluoroethylene (CTFE) and bromotrifluoroethylene;
$CF_2=CFOR_f$ (per)fluoroalkylvinylethers (PAVE), wherein $R_f$ is a $C_1-C_6$ (per)fluorcalkyl, for example trifluoromethyl, bromodifluoromethyl, pentafluoropropyl;
$CF_2=CFOX$ perfluoro-oxyalkylvinylethers, wherein X is a $C_1-C_{12}$ perfluoro-oxyalkyl having one or more ether groups, for example perfluoro-2-propoxy-propyl.

Preferably the fluorinated monomers of type (B) are selected from one or more of the following:
$F_2C=CF-O-CF_2-CF_2-SO_2F$;
$F_2C=CF-O-[CF_2-CXF-O]_n-CF_2-CF_2-SO_2F$ wherein X=Cl, F or $CF_3$; n=1–10;
$F_2C=CF-O-CF_2-CF_2-CF2-SO_2F$
$F_2C=CF-Ar-SO_2F$ wherein Ar is an aryl ring;
$F_2C=CF-O-CF_2-CF_2-CF_2-COF$
$F_2C=CF-O-[CF_2-CXF-O]_n-CF_2-CFX-COF$ wherein X=Cl, F or $CF_3$; n=1–10.

Optionally the fluorinated ionomers of the invention can contain from 0.01 to 5% by moles of monomeric units deriving from a bis-olefin of formula:

$$R_1R_2C=CH-(CF_2)_m-CH=CR_5R_6 \qquad (I)$$

wherein:
m=2–10, preferably 4–8;
$R_1$, $R_2$, $R_5$, $R_6$, equal to or different from each other, are H or $C_1-C_5$ alkyl groups.

The introduction as comonomer of the bis-olefin of formula (I), having a number of unsaturations higher than the unit, is advantageous since said comonomer has the function to pre-crosslink the ionomer during the polymerization. The bis-olefin introduction has the advantage to increase the length of the primary chains forming the final reticule.

The (per)fluorinated ionomers can optionally be crosslinked. This is useful to control the membrane porosity to liquids and the occlusion to gases. In fact crosslinking allows to increase the ionomer amount which coates the support walls.

Crosslinking can take place both by ionic and radical route. A mixed crosslinking can also be used. Preferably crosslinking takes place by peroxy route, wherefore the ionomers must contain radical attack sites in the chain and/or in end position of the macromolecules, for examples iodine and/or bromine atoms. The radical crosslinking can take place also on the carbon atoms of the bis-olefin when the ionomer contains said unit.

Crosslinking of ionic type takes place according to known methods of the prior art of ionomers. For example for sulphonic ionomer crosslinking, a crosslinking agent is added which allows the reaction between two —$SO_2F$ groups. See patent application WO 99/38,897.

Preferably the fluorinated ionomers of the invention comprise:
monomeric units deriving from TFE;
monomeric units deriving from $CF_2=CF-O-CF_2CF_2SO_2F$;
monomeric units deriving from the bis-olefin of formula (I);
iodine atoms in terminal position.

As regards the introduction in the chain of such iodine and/or bromine atoms, it can be carried out by addition, in the reaction mixture, of brominated and/or iodinated "cure-site" comonomers, such as bromo and/or iodo olefins having from 2 to 10 carbon atoms (as described for example in U.S. Pat. No. 4,035,565 and U.S. Pat. No. 4,694,045), or iodo and/or bromo fluoroalkylvinylethers (as described in U.S. Pat. No. 4,745,165, U.S. Pat. No. 4,564,662 and EP 199, 138), in such amounts whereby the content of "cure-site" comonomers in the final product is generally in the range 0.05–2 moles per 100 moles of the other basic monomeric units.

Alternatively or also in combination with cure-site comonomers it is possible to introduce end iodine and/or bromine atoms by addition to the reaction mixture of iodinated and/or brominated chain transfer agents, such, for example, the compounds of formula $R_f(I)_x(Br)_y$, wherein $R_f$ is a (per)fluoroalkyl or a (per)fluorochloroalkyl group having from 1 to 8 carbon atoms, while x and y are integers comprised between 0 and 2, with $1 \leq x+y \leq 2$ (see for example U.S. Pat. Nos. 4,243,770 and 4,943,622). It is also possible to use as chain transfer agents iodides and/or bromides of alkaline or alkaline-earth metals, according to U.S. Pat. No. 5,173,553.

Preferably the crosslinking of radical type uses ionomers containing units of the bis-olefin of formula (I) and iodine in the end position of the macromolecule chains.

When the sulphonic ionomer of the invention is crosslinked by radical route, it is used a crosslinking temperature in the range 100° C.–300° C., depending on the type of the used peroxide, by addition of a suitable peroxide able to generate radicals by heating. Generally, the peroxide amount is in the range 0.1%–10% by weight with respect to the polymer. Among them it can be mentioned: dialkylperoxides, such as for example di-terbutyl-peroxide and 2,5-dimethyl-2,5-di(terbutylperoxy)hexane; dicumyl peroxide; dibenzoyl peroxide; diterbutyl perbenzoate; di-1,3-dimethyl-3-(terbutylperoxy)butylcarbonate. Other peroxidic systems are described, for example, in patents EP 136,596 and EP 410,351.

Furthermore it can be added before crosslinking:

(a) a crosslinking co-agent, in an amount in the range 0.5–10%, preferably 1–7% by weight with respect to the polymer; among them, we can mention: triallyl-cyanurate; triallyl-isocyanurate (TAIC); tris (diallylamine)-s-triazine; triallylphosphite; N,N-diallyl-acrylamide; N,N,N',N'-tetraallyl-malonamide; trivinyl-isocyanurate; 2,4,6-trivinyl-methyltrisiloxane; N,N'bisallylbicyclo-oct-7-ene-disuccinimide (BOSA); bis olefin of formula (I), triazine;

(b) a metal compound, in amounts in the range 1–15%, preferably 2–10%, by weight with respect to the polymer, selected from oxides or hydroxides of divalent metals, such as for example Mg, Zn, Ca or Pb, optionally combined with a weak acid salt, such as for example stearates, benzoates, carbonates, oxalates or phosphites of Ba, Na, K, Pb, Ca;

(c) other conventional additives, such as thickeners, pigments, antioxidants, stabilizers and the like;

(d) inorganic or polymeric reinforcing fillers, preferably PTFE, optionally fibrillable PTFE. Preferably fillers have sizes from 10 to 100 nm, preferably 10–60 nm.

An essential feature of the invention is that an amorphous ionomer is used to allow an uniform coating of all the microstructures which form the support pores.

By amorphous ionomers, those showing a substantial absence of crystallinity are meant. For example at the X rays diffraction analysis, the crystallinity peak(s) must be absent, in particular the peak at 18° at 2Θ must be absent (see the Examples). According to the present invention the presence of a residual crystallinity lower than 5% can be allowed, preferably lower than 1%, and anyway such that the water permeability is not lower than the above limit. In this case the crystallinity is calculated as indicated in the Examples.

The membrane porosity, in addition to the crosslinking as above indicated, can also be controlled by adding in the composition one or more (per)fluoropolymers. Amorphous or crystalline (per)fluoropolymers can be mentioned, the amorphous ones being different from the ionomer of the membrane of the invention. Examples of amorphous are (per)fluoroelastomers, such as copolymers TFE/(per) fluorovinylethers, TFE/VDF/HFP and/or (per) fluorovinylethers. Examples of crystalline are, PVDF, PFA, MFA, FEP (optionally modified with vinylethers), PTFE. Preferably the (per)fluoropolymers are of crystalline ionomeric type.

Porous membranes, preferably having pores not completely occluded to gases are particularly suitable to be used in separation processes, for example in microfiltration and ultrafiltration processes of aqueous solutions, in pervaporation processes for example to dehydrate humid gases.

Due to the high water permeability of the membranes of the invention, with respect to the membranes of the prior art, smaller membrane surfaces are required and therefore cheaper plants. This represents a remarkable advantage from the industrial point of view obtainable with the membranes of the invention.

Porous membranes having pores completely occluded to gases are particularly suitable for iperfiltration and/or reverse osmosis processes.

When the membranes of the invention are used for hot filtrations, at temperatures higher than the room one and up to 150° C. in the presence of an aqueous solution flow, the fluorinated ionomers of the invention are preferably used in crosslinked form and step d) of the process as mentioned below is carried out. When the membranes of the invention are used at room or lower temperature, step d) of the process indicated below is optional.

A further object of the present invention is a process for preparing a hydrophilic porous membrane, comprising a porous support formed by a (per) fluorinated polymer, and amorphous (per)fluorinated ionomers, containing hydrophilic groups, preferably having —$SO_3H$ or —COOH functionality, said process comprising the following steps:

a) impregnation of the porous support formed by the (per) fluorinated polymer, with a (per)fluorinated ionomer having hydrolyzable groups, preferably —$SO_2F$, —COOR, —COF, wherein R is a $C_1$–$C_{20}$ alkyl radical or a $C_6$–$C_{20}$ aryl radical, using a solution of the ionomeric compound in fluorinated organic solvent at a concentration in the range 1–20% by weight, preferably 4–20% by weight till obtaining a membrane having the pores substantially filled by the ionomeric solution, the impregnation is carried out at temperatures comprised between the room temperature and 120° C., preferably between 15° C. and 40° C.; the so impregnated membrane is subjected to thermal treatment at temperatures from 50° to 200° C., preferably from 120° to 160° C. till substantial removal of the solvent and obtainment of a substantially transparent membrane, optionally step a) is repeated until the membrane appears substantially transparent;

b) treatment of the membrane obtained in a) with inorganic strong, preferably aqueous, alkales, i.e. bases which are completely dissociated in water, to obtain the conversion of the functional groups into hydrophilic groups, preferably from —$SO_2F$ into —$SO_3^-$, and of the —COOR, —COF groups into —$COO^-$ groups;

c) treatment of the membrane obtained in b) with inorganic strong acids, i.e. acids which are completely dissociated in aqueous solution, obtaining the (per)fluorinated ionomer in acid hydrophilic form;

d) optionally treatment with water at temperatures in the range 50° C.–100° C., optionally repeated, until removal of the ionomer excess and neutral pH of the washing waters.

In step a) the fluorinated organic solvent must allow the complete dissolution of the fluorinated ionomer at the indicated concentrations. The preferred solutions are those having a viscosity which allows the best impregnation. Examples of said solvents are methylperfluorobutylether, perfluorohexane, perfluoroheptane. Besides the solvent in step a) must have a boiling point at room pressure lower than 180° C., preferably lower than 120° C.

At the end of step a) the membrane can appear opaque or transparent. This depends on the solution viscosity, on the impregnation temperature and on the thermal treatment temperature. Step a) is repeated one or more times until a transparent membrane is obtained.

In step b) the strong alkales are preferably the hydroxides of the Group Ia metals. Generally temperatures are used such as to obtain a sufficiently rapid conversion of the ionomer functional group. The temperatures used in step b) depend on the base concentration and on the nature of the ionomer functional group. For example in the case of (per)fluorinated ionomers having —$SO_2F$ functionality, a temperature in the range 20°–80° C., preferably 50+–80° C., is used so that the treatment times are generally comprised between 2 and 4 hours.

At the end of step b) the ionomer must not show non hydrolyzed functional groups any more. When the ionomer functional groups are —$SO_2F$, it must be verified that the —$SO_2F$ groups are absent. This can for example be checked by IR spectroscopy (signal of the —$SO_2F$ group at 1470 $cm^{-1}$). If the treatment with strong alkales is carried out on the ionomer having —COOR functionality, the ester hydrolysis can be followed with the methods known to the skilled in the field, until disappearance of the —COOR groups.

Preferably at the end of step b) washings with water are carried out till a neutral pH of the washing waters.

In step c) the treatment with strong acids leads to the complete substitution of the salified groups in the corresponding acid groups. This can be followed by titrating at intervals the membrane with a suitably diluted titrated soda solution. The temperature of step c) is not critical, but preferably one operates at room temperature. The strong acids commonly used are $H_2SO_4$, HCl, $HNO_3$.

At the end of step c), step d) is preferably carried out until a neutral pH of the washing waters is obtained. In practice for additional washings with water the membrane weight remains constant and does not release ionomer any longer. Generally said treatment is carried out for a time comprised between about 5 minutes and 4 hours.

The membranes obtainable with the process of the invention, as said above, show a substantially homogeneous coating on the whole internal and external surface of the porous support. The ionomer amount which remains under the form of coating is lower than about 20%, generally of the order from 5 to 10% with respect to the total weight ionomer+support. These porous membranes show the maximum water permeability. At the end of step d) the membranes of the invention appear transparent until they are wetted with water. By leaving the membrane at air, this quickly dehydrates (some minutes) and becomes opaque. Under this form the membrane is remarkably gas permeable. However the opaque membranes, unexpectedly, at contact with water become transparent again in a very short time. Therefore the membranes of the invention do not show the dewetting phenomenon as above described.

Optionally in step a), if the ionomer has to be crosslinked, crosslinking agents (a) are added to the impregnation solution in step a) (see above). For example, for the peroxidic crosslinking, peroxides and crosslinking coagents are added to the ionomer attack radicalic site containing (see above). The crosslinking is carried out after the impregnation step a), at temperatures from 100° to 300° C. For example crosslinking can take place in the oven wherein the thermal treatment is carried out as mentioned in step a); or inserting the membrane between two PTFE sheets, each having a thickness of about 100 microns, and carrying out the membrane crosslinking in press at temperatures between 100° C. and 300° C.; or in a closed autoclave at the same temperatures. At the end of the crosslinking if the membrane is not transparent, step a) (comprising the crosslinking) is repeated. When in step a) crosslinking is used, the thermal treatment indicated at the end of step a), which is carried out in this case after the crosslinking step, is optional. With crosslinking, the ionomer amount in excess which is then removed in step d) is reduced.

The membranes obtainable by carrying out the crosslinking show a water permeability lower than the porous non-crosslinked ones, and this depends on the crosslinking entity. As extreme limit, membranes completely occluded to gases are obtained. However unexpectedly said membranes occluded to gases still show a good water permeability, higher than the above values. By the crosslinking process, the membrane porosity and therefore the water permeability can be controlled. When the control of the porosity is carried out not by crosslinking but by the addition of an amorphous or crystalline (per)fluoropolymer, at the end of step d), the (per)fluoropolymer is added dissolved in a solvent wherein it is soluble. Methods known in the prior art are used. For example if the (per)fluoropolymer is a crystalline ionomer as impregnation solution a hydroalcoholic solution from which the alcohol is preferably removed before impregnation, can be used. See U.S. Pat. No. 6,179,132. Porous membranes having partially occluded pores and hydrophilic functions, preferably under the form of salts, for example $SO_3Li$, can be used to prepare electrodes and separators for electrochemical applications, for example in lithium batteries.

The following Examples illustrate with non limitative purposes the invention.

EXAMPLES

Determination of the Membrane Water Permeability

The membrane is set at the base of a vertical cylinder, supported by a porous metal plate with holes having diameter of 0.5 mm, the plate having diameter of 36 mm and permeability higher than 500,000 l/(h.m².Atm). The permeability of the metal plate is therefore such that the resistance opposed to the water flow is insignificant with respect to that of the membrane. The membrane is positioned in the measurement device so that it results quite flat and it is not stressed by the applied pressures. In the metal cylinder, above the membrane, 130 ml of deionized and distilled water are poured. The cylinder is closed and the internal pressure is regulated by feeding nitrogen. The pressure is read on a manometer and it is maintained constant at the predetermined value by using a reducer. The water which permeates through the membrane is collected in a container placed under the cylinder. One operates so that at the end of the experiment 30 ml of water remain above the membrane, to avoid that it dehydrates. The flow-rate is determined by the weighing of the collected water and by the employed time. By dividing the flow-rate by the surface of the porous septum, the flow is determined. Measurements at 0.5, 1, 1.5 and 2 Atm, corresponding to 50 KPa, 101 KPa, 150 Kpa and 202 KPa, respectively, are carried out. The measurements are carried out when the membrane operates under stationary conditions, i.e. when the water flow and the pessure exerted on the liquid assume constant values in the time. Then the water permeability is determined, i.e. the volume collected in the unit of time, for unit of membrane surface and for unit of pressure. This parameter is determined calculating the slope of the straight line obtained by reporting in a cartesian diagram the flow in function of the pressure. The slope of the straight line passing through the diagram origin point is calculated; it gives the minimum mean square deviation with respect to the experimental values of the flows measured at the pressures of 0.5, 1, 1.5 and 2 atm.

Determination of the Permeability to Air (Gurley Number)

The Gurley test of permeability to air measures the time in seconds necessary to obtain the flowing of 100 ml of air under a pressure corresponding to that exerted by a 12 cm water column through a membrane having a surface of 6.45 cm$^2$ (1 sq. inch). The measure is carried out in a Gurley type porosimeter (ASTM 0726-58). The specimen is fixed above the instrument cylinder and fastened among the sealing plates. The cylinder is then let softly go down. The automatic chronometer, joined to a photoelectric cell, is used to record the time (seconds) necessary to the discharge from the cylinder of the above air volume through the membrane. This time is indicated as Gurley number.

Determination of the Ionomer Amount in the Invention Membrane

The ionomer amount now present in the tested specimen is calculated by weighing, knowing the initial weight of the membrane.

Saline Rejection

The equipment is the same used for the test of water permeability and the the test preparation is the same. Above the membrane 130 ml of a saline solution at a known concentration are placed. The cylinder is then closed and the internal pressure controlled by nitrogen.

The pressure is maintained constant at the predetermined value, which must be higher than the value of the osmotic pressure of the saline solution, using a reducer and measuring the pressure by a manometer. The solution which passes through the membrane is collected in a container placed under the cylinder. After having discarded a first aliquot of 8 ml of the passed solution, a second aliquot of the same volume is collected for the determination. The saline concentration of the solution which has passed through the membrane is determined by conductimetric way by a calibration straight line. The saline rejection is calculated by the following formula:

$$\text{Rejection \%} = 100 \times (1 - M_p/M_l)$$

Wherein $M_p$ is the molarity of the passed solution and $M_l$ the molarity of the initial solution introduced into the vessel.

Determination of the Crystallinity of the Ionomers

The compound is prepared for the analysis by moulding a specimen having a thickness of 0.3 mm, using a suitable stencil, between two steel plates coated with PTFE at 250° C. and applying a load of 16,000 kg for one minute. The specimen is quickly cooled and treated a second time under the above conditions furtherly lowering the thickness. At the end the specimen is let slowly cool in the press. X-ray diffraction analyses are carried out on the specimen to verify if the ionomer shows the crystallinity peak, identified by the peak at 18° in 2Θ. If the crystallinity peak is absent the ionomer is amorphous. According to the present invention an ionomer which shows a crystallinity degree lower than 5% is also considered amorphous, said per cent crystallinity degree being calculated by the per cent ratio between the peak area at 18° and the peak areas at 18° and 16.5°:

$$\frac{A_{18°}}{A_{18°} + A_{16.5°}} \times 100$$

wherein:
$A_{18°}$ is the peak area at 18° in 2Θ
$A_{16.5°}$ is the peak area at 16.5°, which identifies the amorphous phase.

For the calculation of each area two Lorentz curves have been used since the two peaks are partially overlapped.

S.E.M.+E.D.S. Analyses

BRIEF DESCRIPTION OF DRAWINGS

FIG. 1A. Represents the S.EM. Analysis of a membrane containing 16 mg of ionomer corresponding to 16% by weight.

FIGS. 2A, and 2B. Represent the E.D.S. analysis respectively of the specimen and the bistretched PTFE.

Figure 2A:
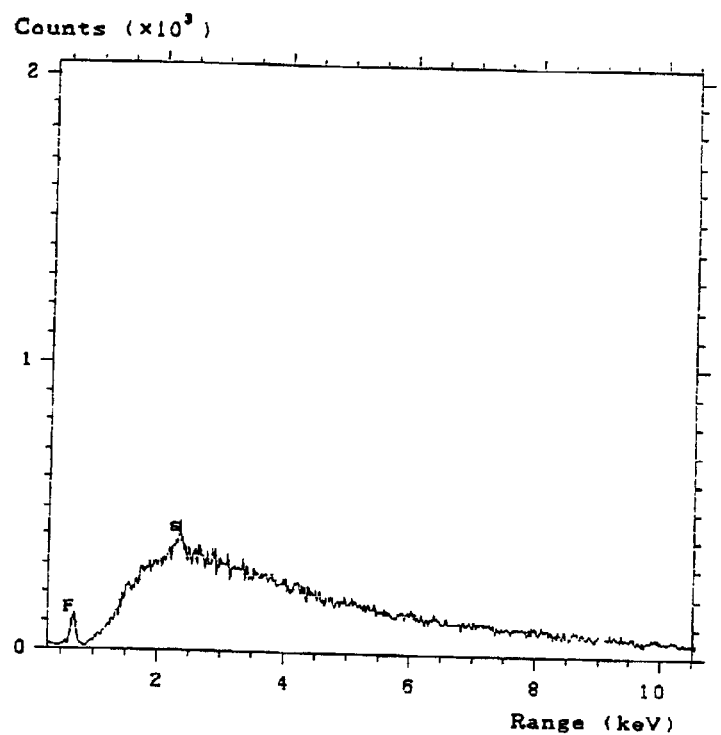

The specimens are coated with carbon to render them conductors and they are examined by S.E.M. (Scanning Electron Microscope) interfaced by E.D.S. system (Energy Dispersive System), which allows to obtain both the imagine and the qualitative spectrum of the inorganic elements present on the surface of the specimen itself.

The used S.E.M. instrument is of the Cambridge Instruments Stereoscan® 120 type, the E.D.S. instrument is of the Link® Analytical eXL type.

Example 1

Preparation of an Ionomer Having Equivalent Weight 461 g/eq

In a 2 liters autoclave, the following reactants are introduced:

800 ml of demineralized water;

78 g of the monomer of formula $CF_2=CF-O-CF_2CF_2-SO_2F$;

240 g of an aqueous solution at 5% by weight of a fluoropolyoxyalkylene having an acid end group salified with ammonium having the following formula: $CF_2ClO(CF_2CF(CF_3)O)_n(CF_2O)_mCF_2COONH_4$ wherein n/m=10, with average molecular weight 527;

7 ml of a solution at 33% by volume of an iodinated transfer agent of formula $I-(CF_2)_6-I$ dissolved in the perfluoropolyether solvent Galden® D02;

2 ml of a solution at 1.5% by volume of the bis-olefin of formula $CH_2=CH-(CF_2)_6-CH=CH_2$ dissolved in perfluoropolyether solvent Galden® D02.

The mixture, maintained under stirring at 700 rpm, is heated to 50° C. Then 100 ml of an aqueous solution at a concentration of 80 g/l of ammonium persulphate (APS) are fed into the autoclave. The pressure is brought to 3 absolute atm by introducing TFE. The reaction starts after 8 min. The pressure is maintained at 3 absolute atm (303 kPa) by feeding TFE. During the polymerization 12 g of the sulphonyl monomer of formula $CF_2=CF-O-CF_2CF_2-SO_2F$ and 2 ml of a solution at 1.5% by volume of the bis-olefin of formula $CH_2=CH—(CF_2)_6—CH=CH_2$ in the solvent Galden® D02 are added for each 6 g aliquot of fed TFE. The total amount of fed TFE into the reactor is 90 g. The reaction is stopped after 312 min from the starting by slackening the stirring, cooling the reactor and venting the TFE. The produced latex has a solid content of 23% by weight. The latex is coagulated by freezing, the polymer is separated from the mother liquors and dried at 100° C. for 16 h at room pressure. The copolymer composition determined by NMR is the following as per cent by moles: 64.4% of TFE and 35.6% of sulphonic monomer, corresponding to an equivalent weight of 461 g/eq. The content by weight of iodine in the ionomer, measured by X-ray fluorescence (XRF), is of 0.36%.

The ionomer is amorphous since at the X-ray analysis it does not show the crystallinity peak as above defined.

Example 2

Preparation of a Non-Crosslinked Porous Membrane with an Ionomer Content of Example 1 in an Amount of 8% by Weight 1.71 g of the ionomer having equivalent weight 461 g/eq are dissolved in 34 g of methylperfluorobutylether (HFE® 7100). The so prepared ionomer solution is used to impregnate a porous PTFE membrane having a thickness of 40 μm, average pore diameter (porosity) of 0.2 μm and weight of 91 mg, set on a PTFE frame having an internal diameter of 60 mm. The membrane is impregnated with the solution on each side depositing thereon a solution head. Subsequently it is vertically set for some seconds to remove the impregnating solution excess from the surface and then put in a stove at 140° C. for 10 min. The impregnation step, including the passage in stove, is repeated three times, obtaining a transparent membrane.

The membrane is activated, i.e. the polymer sulphonyl groups $SO_2F$ are transformed into acid sulphonic groups $SO_3H$, by treating the membrane for 4 h at 70° C. in an aqueous KOH solution at 10% by weight, washing the membrane in demineralized water, treating the membrane for 16 h at room temperature in an aqueous HCl solution at 20% by weight and lastly washing with demineralized water.

The membrane is then kept in demineralized water for 1 h at 100° C., the water is removed and the membrane dried in a stove at 110° C.

The membrane, white-coloured at the dry state, becomes transparent at contact with the water. It weighs 99 mg; therefore it contains 8 mg of ionomer, which corresponds to 8% of the membrane weight.

Gurley number: 140 s.

Water permeability: 2042 l/(h.m².atm).

Example 3

Preparation of an Ionomer Having Equivalent Weight 588 g/eq

In a 2 liter autoclave, the following reactants are introduced:

850 ml of demineralized water;

74 g of the monomer of formula $CF_2=CF—O—CF_2CF_2—SO_2F$;

240 g of an aqueous solution at 5% by weight of a fluoropolyoxyalkylene having an acid end group salified with ammonium ion having the following formula: $CF_2ClO(CF_2CF(CF_3)O)_n(CF_2O)_mCF_2COONH_4$ wherein n/m=10, with average molecular weight of 527;

13 ml of a solution at 33% by volume of an iodinated transfer agent of formula $I—(CF_2)_6—I$ in a perfluoropolyether solvent Galden® D02;

2 ml of a solution at 1.5% by volume of the bis-olefin of formula $CH_2=CH—(CF_2)_6—CH=CH_2$ in a perfluoropolyether solvent Galden® D02.

The mixture, maintained under stirring at 700 rpm, is heated to 60° C. Then 50 ml of an aqueous solution at a concentration of 8 g/l of ammonium persulphate (APS) are fed into the autoclave. The pressure is brought to 6 absolute atm (606 KPa) by introducing TFE. The reaction starts after 2 min. The pressure is maintained at 6 absolute atm by feeding TFE. During the polymerization 19 g of the sulphonyl monomer of formula $CF_2=CF—O—CF_2CF_2—SO_2F$ and 2 ml of a solution at 1.5% by volume of the bis-olefin of formula $CH_2=CH—(CF_2)_6—CH=CH_2$ in the solvent Galden® D02 are added for each 9 g aliquot of fed TFE. The total amount of fed TFE into the reactor is 180 g. The reaction is stopped after 221 min from the starting, by slackening the stirring, cooling the reactor and venting the TFE. The produced latex has a solid content of 25% by weight. The latex is coagulated by freezing, the polymer is separated from the mother liquors and dried at 100° C. for 16 h at room pressure. The copolymer composition determined by NMR is the following as per cent by moles: 75.5% of TFE and 24.5% of sulphonic monomer, corresponding to an equivalent weight of 588 g/eq. The content by weight of iodine in the ionomer, measured by X-ray fluorescence (XRF), is of 0.55%.

The ionomer is amorphous since at the X-ray analysis it does not show the crystallinity peak.

Example 4

Preparation of a Crosslinked Porous Membrane with an Ionomer Content of Example 3 Equal to 16% by Weight 1.32 g of ionomer having equivalent weight 588 g/eq are dissolved in 26 g of methylperfluorobutylether (HFE® 7100). To 7.13 g of the so prepared solution, 0.38 g of a crosslinking agent solution, obtained by mixing 6.8 g of Luperox 101 (2,5-bis(tert-butylperoxy)-2,5-dimethylhexane), 14.9 g of bis-olefin of formula $CH_2=CH—(CF_2)_6—CH=CH_2$ and 63.9 g of HFE® 7100 are added. The so obtained solution of the ionomer and crosslinking agents is divided in two aliquots which are used to impregnate respectively each side of the porous PTFE membrane having a thickness of 40 μm, average pore diameter (porosity) of 0.2 μm and weight of 86 mg, previously set on a PTFE frame having an internal diameter of 60 mm. The solvent is let evaporate at the air and the membrane is transferred inside a closed metal vessel, so as to prevent the removal of the crosslinking agents, which is put between two plates of a press at the temperature of 170° C. for 15 min to obtain the ionomer crosslinking. After the crosslinking process the membrane is taken away from the frame. It appears transparent and weighs 404 mg.

The transformation of the polymer sulphonyl groups $SO_2F$ into acid sulphonic groups $SO_3H$ is carried out as in Example 2 except that the acidification time is reduced to 4 hours and the membrane is lastly maintained in demineralized water for 1 h at 85° C. and dried in a stove.

The membrane, white-coloured at the dry state, becomes transparent at contact with the water. It weighs 102 mg, it contains therefore 16 mg of ionomer corresponding to 16% of the total weight (ionomer+PTFE porous support).

Gurley number: 479 s.

Water permeability: 241 l/(h.m².atm).

The specimen has been analyzed by S.E.M. obtaining the photography reported in FIG. 1A.

For comparison, the bistretched PTFE specimen used for obtaining the membrane has been analyzed with the same S.E.M. method (FIG. 1B).

It is noticed that the ionomer has coated in a continuous way the PTFE knot and fibril structure. In the membrane structure it is possible to still distinguish the PTFE knot and fibril structure.

Figure 2B:
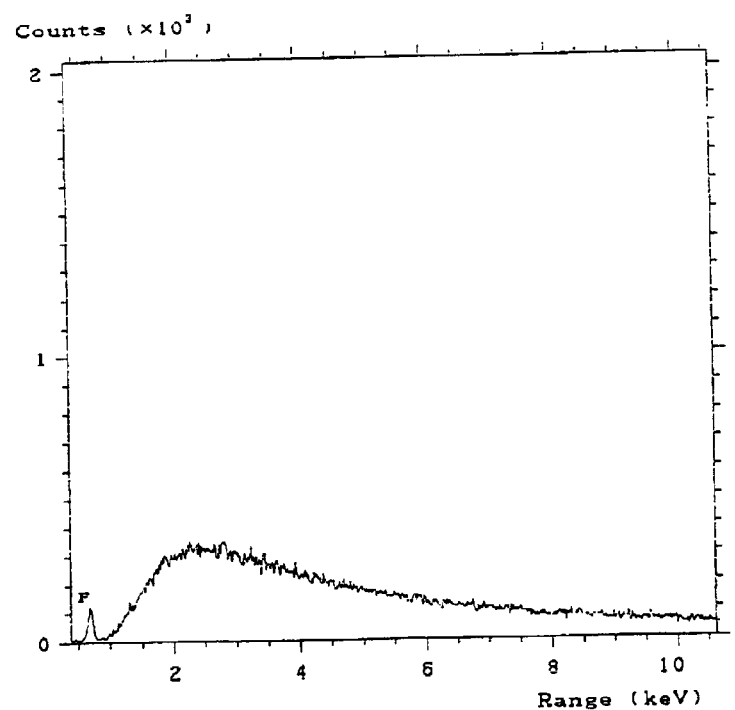
FIG. 2B. Represents the S.E.M. analysis of the bistretched PTFE specimen.

The E.D.S analysis respectively of the specimen and of the bistretched PTFE has been reported in FIGS. 2A and 2B respectively.

In both the fluorine peak is observed at about 0.7 KeV and in the E.D.S. spectrum of the membrane the peak at about 2.4 KeV corresponding to the sulphur peak.

It is to be noted that the sulphur peak shows, as said, only the surface part of the total amount of ionomer present in the membrane, which in this case corresponds to a total ionomer amount of 16%.

Example 5
Preparation of a Crosslinked Porous Membrane Containing an Ionomer Amount of Example 3 Equal to 33% by Weight 2.85 g of ionomer having equivalent weight 588 g/eq are dissolved in 28.5 g of methylperfluorobutylether (HFE® 7100). To 11.5 g of the so prepared solution, 0.51 g of a crosslinking agent solution are added, obtained by mixing 6.8 g of Luperox 101 (2,5-bis(tert-butylperoxy)-2,5-dimethylhexane), 14.9 g of bis-olefin of formula $CH_2=CH-(CF_2)_6-CH=CH_2$ and 63.9 g of HFE® 7100.

The so prepared solution of ionomer and crosslinking agents is used to impregnate a porous PTFE membrane having a thickness of 40 µm and weight of 68 mg, set on a PTFE frame having an internal diameter of 60 mm. The membrane is impregnated with the solution on each side depositing thereon a solution head. Subsequently it is vertically set for some seconds to remove the excess of the impregnating solution from the surface. It is then taken away from the frame, placed between two PTFE sheets having a thickness of 250 µm and put in a press at 170° C. for 15 min to obtain the ionomer crosslinking.

Gurley number: 326 s.

Water permeability: 10 l/(h.m².atm).

Example 6
Preparation of an Ionomer Having Equivalent Weight 524 q/eq

In a 2 liter autoclave, the following reactants are introduced:

850 ml of demineralized water;

74 g of the monomer of formula $CF_2=CF-O-CF_2CF_2-SO_2F$;

240 g of an aqueous solution at 5% by weight of a fluoropolyoxyalkylene having an acid end group salified with ammonium ion having the formula: $CF_2ClO(CF_2CF(CF_3)O)_n(CF_2O)_mCF_2COONH_4$ wherein n/m= 10, with average molecular weight of 527;

6.5 ml of a solution at 33% by volume of an iodinated transfer agent of formula $I-(CF_2)_6-I$ in a perfluoropolyether solvent Galden® D02;

2 ml of a solution at 1.5% by volume of the bis-olefin of formula $CH_2=CH-(CF_2)_6-CH=CH_2$ in a perfluoropolyether solvent Galden® D02.

The mixture, maintained under stirring at 700 rpm, is heated to 60° C. Then 50 ml of an aqueous solution at a concentration of 16 g/l of ammonium persulphate (APS) are fed into the autoclave. The pressure is brought to 5 absolute atm (505 KPa) by introducing TFE. The reaction starts after 14 min. The pressure is maintained at 5 absolute atm by feeding TFE. During the polymerization 17 g of the sulphonyl monomer of formula $CF_2=CF-O-CF_2CF_2-SO_2F$ and 2 ml of a solution at 1.5% by volume of the bis-olefin of formula $CH_2=CH-(CF_2)_6-CH=CH_2$ in the solvent Galden® D02 are added for each 8 g aliquot of fed TFE. The total amount of fed TFE to the reactor is 160 g. The reaction is stopped after 296 min from the starting, by slackening the stirring, cooling the reactor and venting the TFE. The produced latex has a solid content of 25% by weight. The latex is coagulated by freezing, the polymer is separated from the mother liquors and dried at 100° C. for 16 h at room pressure. The copolymer composition determined by NMR, as percentage by moles, is the following: 70.9% of TFE and 29.1% of sulphonic monomer, corresponding to an equivalent weight of 524 g/eq. The content by weight of iodine in the ionomer, measured by X-ray fluorescence (XRF), is of 0.30%.

The ionomer is amorphous since at the X-ray analysis the crystallinity peak is not noticed.

Example 7
Preparation of a Non-Crosslinked Membrane Containing an Ionomer Amount of Example 6 in an Amount Equal to 29% by Weight 29.9 g of ionomer having equivalent weight 524 g/eq are dissolved in 433 g of methylperfluorobutylether (HFE® 7100). The so prepared ionomer solution is used to impregnate a porous PTFE membrane having a thickness of 40 µm, porosity (average pore diameter) of 0.2 µm and weight of 86 mg, set on a PTFE frame having an internal diameter of 60 mm. The membrane is impregnated with the solution on each side depositing thereon a solution head. Subsequently it is vertically set for some seconds to remove the excess of impregnating solution from the surface and it is introduced in a stove at 140° C. for 5 min. 1 ml of the impregnating solution is subsequently deposited on the membrane on each side, homogeneously distributed on the whole membrane surface. The partial evaporation of the solvent at the air is awaited and it is completed in a stove at 140° C. for 5 min. The membrane appears transparent.

The membrane is activated, i.e. the polymer sulphonyl groups $SO_2F$ are transformed into acid sulphonic groups $SO_3H$, by treating the membrane for 4 h at 70° C. in an aqueous KOH solution at 10% by weight, subsequently washing in demineralized water, treating then for 4 h at room temperature in a HCl aqueous solution at 20% by weight and lastly washing in demineralized water.

The membrane is dried in a stove at 100° C. The membrane is transparent also at the dry state. The specimen weight is of 121 mg, it contains therefore 35 mg of ionomer corresponding to 29% of the total weight.

Gurley number: >10,000 s.

Water permeability: 14 l/(h.m².atm).

Example 8
Preparation of a Non-Crosslinked Membrane Containing an Ionomer Amount of Example 6 in an Amount Equal to 65% by Weight The ionomer impregnating solution having equivalent weight 524 g/eq in HFE 7100 prepared in Example 7 is used to impregnate a PTFE membrane equal to that of Example 7, set on a circular frame having the same sizes. The membrane is impregnated with the solution on each side depositing thereon a solution head. Subsequently it is vertically set for some seconds to remove the excess of the impregnating solution from the surface and then put in a stove at 140° C. for 5 min. 1 ml of the impregnating solution is subsequently deposited on the membrane on each side, uniformly distributed on the whole membrane surface. The solvent is partially evaporated at the air and then it is transferred in a stove at 140° C. for 5 min.

This treatment with 1 ml of impregnating solution and subsequent evaporation of the solvent is repeated a second time. The obtained specimen is transparent.

The membrane is activated by treating with the solutions and washings with water as described in the previous Example.

The membrane is dried in a stove at 100° C. The membrane is transparent also at the dry state. The specimen weighs 240 mg, therefore it contains 154 mg of ionomer corresponding to 65% of the membrane weight.

Gurley number: >10,000 s.

Water permeability: 2 l/(h.m².atm).

Example 9
Preparation of a Non-Crosslinked Membrane Containing an Ionomer Amount of Example 6 in an Amount Equal to 75% by Weight The ionomer impregnating solution having equivalent weight 524 g/eq in HFE 7100 prepared in Example 7 is used to impregnate a PTFE membrane equal to that of Example 7, set on a circular frame having the same sizes. The membrane is impregnated with the solution on each side depositing thereon a solution head. Subsequently it is vertically set for some seconds to remove the excess of the impregnating solution from the surface and then put in a stove at 140° C. for 5 min. 1 ml of the impregnating solution is subsequently deposited on the membrane on each side, uniformly distributed on the whole surface of the membrane. The solvent is partially evaporated at the air and then it is transferred in a stove at 140° C. for 5 min.

This treatment with 1 ml of impregnating solution and subsequent evaporation of the solvent is repeated two more times. The obtained specimen is transparent.

The membrane is activated by treating with the solutions and washings with water as described in Example 7.

The membrane is dried in a stove at 100° C. The membrane is transparent also at the dry state. The specimen weighs 345 mg, therefore it contains 259 mg of ionomer corresponding to 75% of the membrane weight.

Gurley number: >10,000 s.

Water permeability: 4 l/(h.m².atm).

Example 10
Preparation of an Ionomer Having Equivalent Weight 499 g/eq

In a 2 liter autoclave the following reactants are fed:

700 ml of demineralized water;

74 g of the monomer of formula $CF_2=CF-O-CF_2CF_2-SO_2F$;

29 g of a microemulsion of fluoropolyoxyalkylenes previously obtained by mixing:

11.6 g of a fluoropolyoxyalkylene having an acid end group salified with potassium having the following formula: $CF_2ClO(CF_2CF(CF_3)O)_n(CF_2O)_mCF_2COOK$ wherein n/m=10, and having average molecular weight 527;

5.8 g of a perfluoropolyether oil Galden® D02 of formula $CF_3O(CF_2CF(CF_3)O)_n(CF_2O)_mCF_3$ wherein n/m=20 having average molecular weight 450;

11.6 g of water;

5.7 ml of a solution at 33% by volume of an iodinated transfer agent of formula $I-(CF_2)_6-I$ in a perfluoropolyether solvent Galden® D02;

1.5 ml of a solution 1.5% by volume of the bis-olefin of formula $CH_2=CH-(CF_2)_6-CH=CH_2$ in a perfluoropolyether solvent Galden® D02.

The mixture is maintained under stirring at 700 rpm and heated to 50° C. Then 400 ml of an aqueous solution at a concentration of 20 g/l of potassium persulphate (KPS) are then fed into the autoclave and the pressure is brought to 3 absolute atm (303 KPa) by introducing TFE. The reaction starts after 3 min. The pressure is maintained at 3 absolute atm by feeding TFE. During the polymerization 12 g of the sulphonyl monomer of formula $CF_2=CF-O-CF_2CF_2-SO_2F$ and 1.5 ml of a solution at 1.5% by volume of the bis-olefin of formula $CH_2=CH-(CF_2)_6-CH=CH_2$ dissolved in the solvent Galden® D02 are added for each 12 g aliquot of fed TFE. The total amount of TFE fed to the reactor is 88 g. The reaction is stopped after 277 min from the starting, by slackening the stirring, cooling the reactor and venting the TFE. The produced latex has a solid content of 25% by weight. The latex is coagulated by freezing, the polymer is separated from the mother liquors and dried at 100° C. for 8 h at room pressure. The copolymer composition determined by NMR is the following as per cent by moles: 68.7% of TFE and 31.3% of sulphonic monomer, corresponding to an equivalent weight of 499 g/eq. The per cent content by weight of iodine in the ionomer, measured by X-ray fluorescence (XRF), is of 0.25%.

The ionomer is amorphous since at the X-ray analysis the crystallinity peak is absent.

Example 11
Preparation of a Non-Crosslinked Porous Membrane Containing an Ionomer Amount of Example 10 Equal to 60% by Weight.

30 g of the ionomer obtained in Example 10 are dissolved in 600 g of methylperfluorobutylether (HFE 7100). The so prepared ionomer solution is used to impregnate a porous PTFE membrane having a thickness of 40 $\mu$m, porosity as above defined equal to 0.2 $\mu$m and weight of 90 mg, set on a PTFE frame having an internal diameter of 60 mm. The membrane is vertically dipped into the solution, then extracted and vertically kept until the complete solvent evaporation.

Then it is dipped again in the solution in vertical position, extracted and vertically kept for some seconds to remove the excess of impregnating solution from the surface, and dried in a stove at 170° C. for 10 min.

This second impregnation step is repeated for other two times, obtaining a transparent membrane.

The membrane is activated as described in Example 2. The membrane is dried in a stove at 120° C. The membrane is transparent at the dry state too.

The specimen weighs 225 mg, therefore it contains 135 mg of ionomer (corresponding to 60% on the membrane weight, i.e. PTFE+ionomer).

The membrane is tested for the saline rejection using a NaCl solution 0,02M and a 2 bar pressure. The found molarity of the permeated product is 0.013 M, i.e. the 65% of the molarity of the solution which has been fed (rejection value=35%).

Gurley number: >10,000 s.

Water permeability: 1.5 l/(h.m².atm).

Example C (Comparative)
Ionomer Preparation Having Equivalent Weight 735 g/eq
In a 2 liter autoclave the following reactants are fed:

1 l of demineralized water;

74 g of the monomer of formula $CF_2=CF-O-CF_2CF_2-SO_2F$;

29 g of a microemulsion of fluoropolyoxyalkylenes previously obtained by mixing:

11.6 g of a fluoropolyoxyalkylene having an acid end group salified with potassium having the formula: $CF_2ClO(CF_2CF(CF_3)O)_n(CF_2O)_mCF_2COOK$ wherein n/m=10, and having average molecular weight 527;

5.8 g of a perfluoropolyether oil Galden® D02 of formula $CF_3O(CF_2CF(CF_3)O)_n(CF_2O)_mCF_3$ wherein n/m=20 having average molecular weight 450;

11.6 g of water.

The mixture is maintained under stirring at 500 rpm and heated to 50° C. Then 100 ml of an aqueous solution at a concentration of 20 g/l of potassium persulphate (KPS) are fed into the autoclave. The pressure is then brought to 6 absolute atm (606 KPa) by introducing TFE. The reaction starts after 23 min. The pressure is maintained at 6 absolute atm by feeding TFE. During the polymerization 12 g of the sulphonyl monomer of formula $CF_2=CF-O-CF_2CF_2-SO_2F$ are added for each 11 g aliquot of fed TFE. The total amount of TFE fed to the reactor is 225 g. The reaction is stopped after 317 min from the starting by slackening the stirring, cooling the reactor and venting the TFE. The produced latex has a solid content of 37% by weight. The latex is coagulated in a solution of nitric acid 1M, the obtained coagulum washed until neutrality of the washing waters.

The so obtained polymer is activated by transforming the sulphonyl groups $SO_2F$ of the polymer into acid sulphonic groups $SO_3H$. The transformation is carried out by treating the polymer for 16 h at 80° C. in KOH at 10%, washing until neutrality, treating at room temperature with HCl at 20% for 24 h and lastly washing again until neutrality of the washing waters.

To determine the equivalent weight of the ionomer some grams of the compound are titrated with a diluted titrated solution of NaOH. The equivalent weight is of 735 g/eq.

The ionomer spectrum obtained at X-ray analysis shows the crystallinity peak at 18° in 2Θ. The calculated crystallinity degree is 10.2%.

Example D (Comparative)

Non-Crosslinked Porous Membrane Containing an Amount of Crystalline Ionomer Equal to 4.7% by Weight Prepared by Using 47 in the Impregnation a Crystalline Ionomer in Acid Form Applying it from an Aqueous Solution, According to U.S. Pat. No. 6,179,132.

Some grams of the polymer obtained in the comparative Example C, having equivalent weight 735 g/eq, are dissolved at a concentration of 3.5% by weight in a mixture formed by methanol, water and a fluoropolyether (H-Galden® B degree) in the ratios 85/11.6/3.4 by weight, according to the teaching of patent publication EP 1,004, 615. The so prepared ionomer solution is diluted three times its volume with water and maintained under vacuum at 90° C., periodically restoring the evaporated volume with water, so as to replace with water the non aqueous components of the solvent mixture used at the beginning, mainly methanol which is the main component. The residual methanol amount is determined by gaschromatography. After 6 hours the methanol results quantitatively removed. At this point the addition of water is stopped and the ionomer solution is concentrated until having a concentration of 2.4% (measured by gravimetry). The so obtained ionomer aqueous solution appears limpid. It is used to treat a porous PTFE membrane having a thickness of 40 μm, average pore diameter of 0.2 μm and weight of 85 mg, set on a PTFE frame having an internal diameter of 60 mm. On one side of the membrane a drop of isopropanol is deposited, which is homogeneously distributed on the membrane surface using the bulb of a polyetylene disposable pipette. The membrane becomes translucid, indicating an isopropanol penetration in the membrane pores. The same treatment is repeated on the other side of the membrane. Before the membrane becomes opaque, a drop of the aqueous solution of ionomer is deposited on the side of the membrane which has first been treated with isopropanol. It is distributed on the surface with the same above technique. One continues to rub the membrane surface with the pipette bulb to avoid the formation of drops on the membrane surface.

Rubbing is prolonged until it is noticed that the ionomer solution does not tend any longer to withdraw in drops. One proceeds then to repeat the same treatment with the ionomer solution on the other side of the membrane. Both sides of the membrane are rubbed for further 6 minutes, i.e. until a thin and homogeneous film is formed on the whole treated membrane surface. The membrane is then put in a stove at 140° C. for 1 minute.

The membrane is white at the dry state and at contact with water it does not become completely transparent.

The so prepared specimen weighs 89 mg, i.e. it contains 3 mg of ionomer, corresponding to 3.4% based on the membrane weight (support+ionomer).

Gurley number: 66 s.

Water permeability: 0.2 $l/(h.m^2.atm)$.

Figure 3A:
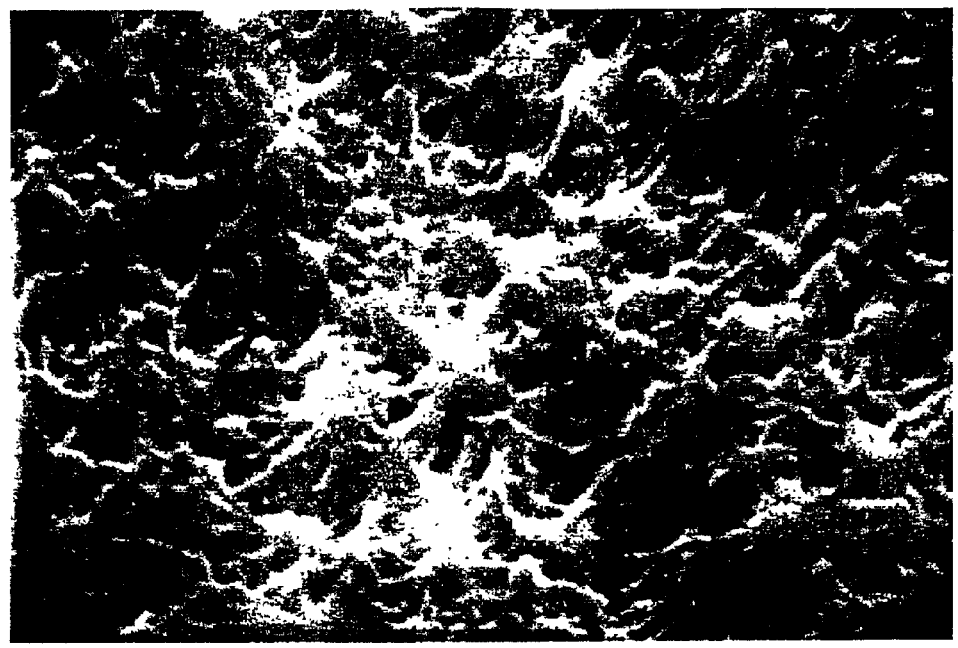
FIG. 3A. Represents the specimen containing 3 mg of ionomer, corresponding to 3.4% of the total weight.

The specimen was analyzed by S.E.M. obtaining the photography reported in FIG. 3A.

By comparing the photography with that of the membrane specimen according to the invention (FIG. 1A-Example 4), it is observed that the membrane obtained according to the comparative Example, although it contains an ionomer amount about 5 times lower than that of the invention (16%), shows a surface wherein the knot and fibril structure is recognizable with more difficulty. This means that the deposited ionomer amount has prevailingly coated the surface.

Figure 3B:
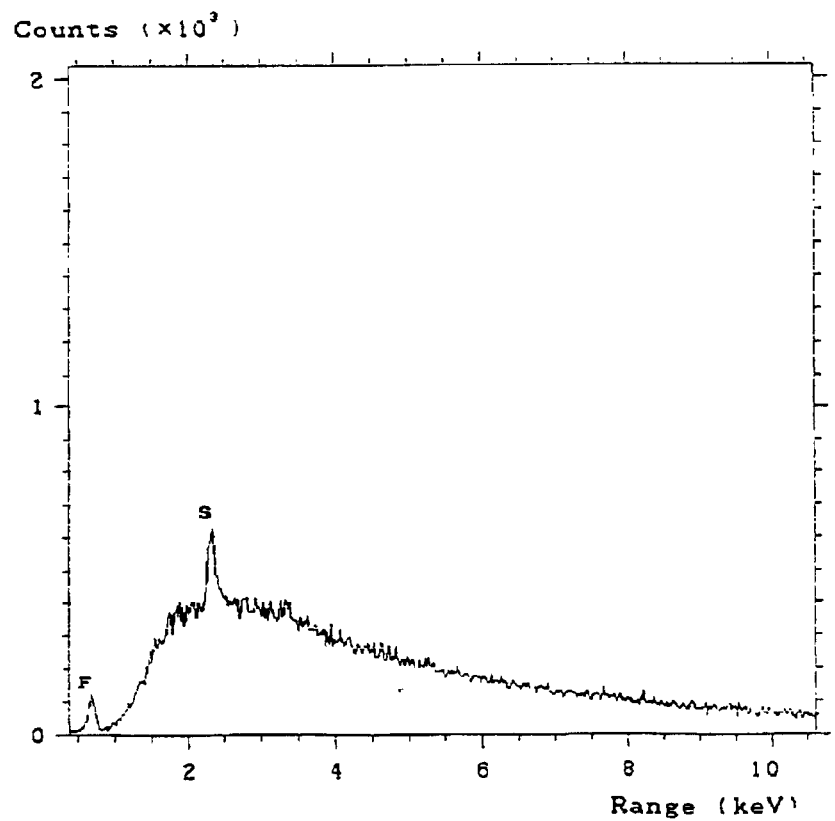
FIG. 3B. Represents the E.D.S. analysis of the specimen containing 3 mg of ionomer, corresponding to 3.4% by total weight.

The E.D.S. analysis is reported in FIG. 3B. The fluorine peak is noted at about 0.7 KeV, the sulphur peak at about 2.4 KeV. By comparing FIG. 3B with FIG. 2A, which represents the E.D.S. spectrum of the specimen of the invention (Example 4), it is observed that the sulphur peak is higher in the membrane prepared according to the teachings of the prior art, even though the total amount of ionomer, as said, is lower than that present on the membrane according to the invention.

This analysis confirms the conclusions drawn from the comparison between the photographies of FIG. 3A and of FIG. 1A.

Example E (Comparative)

Ionomer Preparation Having Equivalent Weight 915 g/eq

In a 2 liter autoclave the following reactants are fed:

1.2 l of demineralized water;

88 g of the monomer of formula $CF_2=CF-O-CF_2CF_2-SO_2F$;

35 g of a microemulsion of fluoropolyoxyalkylenes previously obtained by mixing:

14 g of a fluoropolyoxyalkylene having an acid end group salified with potassium, having the formula: $CF_2ClO(CF_2CF(CF_3)O)_n(CF_2O)_mCF_2COOK$ wherein n/m=10, and having average molecular weight 527;

7 g of a perfluoropolyether oil Galden® D02 of formula $CF_3O(CF_2CF(CF_3)O)_n(CF_2O)_mCF$ wherein n/m=20 having average molecular weight 450;

14 g of water.

The mixture is maintained under stirring at 500 rpm and is heated to 50° C. Then 120 ml of an aqueous solution at a concentration of 20 g/l of potassium persulphate (KPS) are fed into the autoclave. The pressure is then brought to 11 absolute atm (1111 KPa) by introducing TFE. The reaction starts after 30 min. The pressure is maintained at 11 absolute atm by feeding TFE. During the polymerization 15 g of the sulphonyl monomer of formula $CF_2=CF-O-CF_2CF_2-SO_2F$ are added for each 20 g aliquot of fed TFE. The total amount of TFE fed to the reactor is 400 g. The reaction is stopped after 275 min from the starting by slackening the stirring, cooling the reactor and venting the TFE. The produced latex has a solid content of 36% by weight. The latex is coagulated in a solution of nitric acid 1M, the obtained coagulum washed until neutrality of the washing waters.

The so obtained polymer is activated transforming the sulphonyl groups $SO_2F$ of the polymer into acid sulphonic groups $SO_3H$. The transformation is carried out by treating the polymer for 16 h at 80° C. in KOH at 10%, washing until neutrality, treating at room temperature with HCl at 20% for 24 h and lastly washing again until neutrality of the washing waters.

To determine the equivalent weight of the ionomer some grams of the compound are titrated with a diluted titrated solution of NaOH. The equivalent weight is of 915 g/eq.

The ionomer spectrum obtained at X-ray analysis shows the crystallinity peak at 18° in 2Θ. The calculated crystallinity degree is 23.2%.

Example F (Comparative)

Non-Crosslinked Membrane Containing an Amount of Crystalline Ionomer Equal to 66% by Weight Prepared by Using in the Impregnation a Crystalline Ionomer in Acid Form Applying it From an Hydroalcohol Solution The polymer having equivalent weight 915 g/eq obtained in the comparative Example E is dissolved at a concentrtion of 3.5% by weight in a mixture formed by methanol, water and a fluoropolyether (H-Galden® degree B) in the ratios 85/11.6/3.4 by weight, according to the teaching of the patent publication EP 1,004,615.

The so prepared ionomer solution is used to impregnate a porous PTFE membrane having a thickness of 40 μm, average pore diameter of 0.2 μm and weight of 96 mg, set on a PTFE frame having an internal diameter of 60 mm. The membrane is dipped in the solution and put in a stove at 140° C. for 10 min. The impregnation step, including the final drying in stove, is repeated 4 times. The membrane is transparent at the dry state and weighs 286 g, i.e. it contains 190 mg of ionomer corresponding to 66% based on the weight of the membrane (support+ionomer).

Gurley number: 10,000 s.

Water permeability: not determinable since the water under the test conditions does not permeate.

This comparative Example shows that by using a crystalline ionomer to impregnate the membrane, membranes are obtained which do not permeate water at concentrations by weight of ionomer at which, using on the contrary amorphous ionomers, membranes permeable to water are obtained as shown in Example 8, wherein the amount of amorphous ionomer on the membrane is 65%, and in Example 9, wherein the amount of amorphous ionomer is 75%.

What is claimed is:

1. Porous hydrophilic membranes comprising a porous inert support on which at least one ionomer is deposited, wherein the membranes have a water permeability higher than 1 l(h.m².Atm), and wherein the ionomer is amorphous and comprises acid hydrophilic groups.

2. Membranes according to claim 1, comprising pores partially or totally occluded to gases.

3. Membranes according to claim 2, comprising pores totally occluded to gases and an ionomer amount higher than about 30% by weight.

4. Membranes according to claim 2, comprising pores totally occluded to gases and an ionomer amount higher than about 20% by weight.

5. A method of dehydrating humid gases comprising contacting said gases with the membranes of claim 4.

6. The method of claim 5, wherein the method of dehydrating is pervaporation.

7. Membranes according to claim 1, wherein the porous inert support is formed by (per)fluoropolymers.

8. Membranes according to claim 1, wherein the ionomer is a (per)fluorinated polymer comprising $-SO_3H$ and/or $-COOH$.

9. Membranes according to claim 8, wherein the ionomer comprises:

(A) monomeric units deriving from one or more fluorinated monomers containing at least an ethylene unsaturation; or (B) fluorinated monomeric units containing functional groups selected from the group consisting of one or more of $-SO_2F$, $-COOR$, and $-COF$, wherein R is a $C_1$ to $C_{20}$ alkyl radical or a $C_6$ to $C_{20}$ aryl radical, and wherein the functional groups are converted into one or more of hydrophilic groups $-SO_3H$ or $-COOH$ in the final membrane.

10. Membranes according to claim 9, the fluorinated monomeric units (A) are selected from the group consisting of:

vinylidene fluoride (VDF);

$C_2$ to $C_8$ perfluoroolefins;

$C_2$ to $C_8$ chloro, bromo- and/or iodo-fluoroolefins:

$CF_2=CFOR_1$ (per)fluoroalkylvinylethers (PAVE), wherein $R_f$ is a $C_1$ to $C_6$ (per)fluoroalkyl; and $CF_2=CFOX$ perfluoro-oxyalkylvinylethers, wherein X is a $C_1$ to $C_{12}$ perfluoro-oxyalkyl having one or more ether groups.

11. Membranes according to claim 9, wherein the fluorinated monomeric units (B) are selected from the group consisting of:

$F_2C=CF-O-CF_2-CF_2-SO_2F$;

$F_2C=CF-O-[CF_2-CXF-O]_n-CF_2-CF_2-SO_2F$, wherein X=Cl, F or $CF_3$ and n=1 to 10;

$F_2C=CF-O-CF_2-CF_2-CF_2-SO_2F$;

$F_2C=CF-Ar-SO_2F$ wherein Ar is an aryl ring;

$F_2C=CF-O-CF_2-CF_2-CF_2-COF$; and $F_2C=CF-O-[CF_2-CXF-O]_n-CF_2-CFX-COF$, wherein X=Cl, F or $CF_3$ and n=1 to 10.

12. Membranes according to claim 8, wherein the (per)fluorinated ionomer is crosslinked.

13. Membranes according to claim 1, wherein the ionomer contains from 0.01% to 5% by moles of monomeric units deriving from a bis-olefin of formula:

wherein:

m=2 to 10; and $R_1$, $R_2$, $R_5$, and $R_6$ are equal to or different from each other and are H or $C_1$ to $C_5$ alkyl groups.

14. Membranes according to claim 1, wherein the at least one ionomer is selected from the group consisting of one or more of the following monomers:

monomeric units deriving from TFE;

monomeric units deriving from $CF_2=CF-O-CF_2CF_2SO_2F$;

monomeric units deriving from the bis-olefin of formula (I); and iodine atoms in end position.

15. Membranes according to claim 1, wherein the ionomer shows a substantial absence of crystallinity.

16. Membranes according to claim 15, wherein the ionomer has a residual crystallinity lower than 5%.

17. Membranes according to claim 1, containing, besides the amorphous ionomer comprising acid hydrophilic groups, one or more amorphous or crystalline (per)fluoropolymers, wherein the amorphous (per)fluoropolymers are one or more (per)fluoroelastomers selected from one or more of the group consisting of TFE/(per)fluorovinylether copolymers, TFE/VDF/HFP, and (per)fluorovinylether.

18. Membranes according to claim 17, wherein the (per) fluoropolymers are of crystalline ionomeric type.

19. A method of separating water from aqueous solutions, by contacting said solutions with the membranes according to claim 1.

20. The method according to claim 19, wherein the method is iperfiltration or reverse osmosis and wherein the membranes comprise pores totally occluded to gases and contain an ionomer amount higher than about 30% by weight.

21. A process for preparing hydrophilic porous membranes according to claim 1, comprising a porous support formed by a (per)fluorinated polymer, and amorphous (per) fluorinated ionomers containing hydrophilic groups, selected from the group consisting of —$SO_3H$ and —COOH, said process comprising:

a) impregnating the porous support with a (per)fluorinated ionomer solution in fluorinated organic solvent, wherein:

the (per)fluorinated ionomer comprises hydrolyzable groups, selected from the group consisting of —$SO_2F$, —COOR, and —COF, wherein R is a $C_1$ to $C_{20}$ alkyl radical or a $C_6$ to $C_{20}$ aryl radical, the concentration of the ionomer in the range 1% to 20% by weight, and the impregnating is carried out at a temperature in the range of from room temperature to 120° C. until the membrane comprises pores substantially filled by the solution;

b) subjecting the impregnated membrane to thermal treatment at temperatures from 50° C. to 200° C., until the solvent is substantially removed and the membrane is substantially transparent;

c) optionally repeating until the membrane appears substantially transparent;

d) treating the membrane with inorganic strong aqueous alkali to convert the functional groups into hydrophilic groups;

e) treating the membrane with inorganic strong acids, to convert the (per)fluorinated ionomer to acid hydrophilic form;

f) optionally treating with water at a temperature in the range of 50° C. to 100° C. to remove the excess ionomer.

22. The process according to claim 21, wherein the organic solvent has a boiling point at room pressure lower than 180° C.

23. The process according to claim 21, wherein the alkali is a hydroxide of Group Ia metals.

24. The process according to claim 21, wherein the treating with water is carried out until the water has neutral pH.

25. The process according to claim 21, wherein the ionomer is crosslinked by adding cross-linking agents to the (per)fluorinated ionomer solution.

26. The process according to claim 25, wherein the cross-linking agents are peroxides, and wherein the temperature of a cross-linking reaction is from 100° C. to 300° C.

27. The method of claim 19, wherein the method of separation is microfiltration or ultrafiltration of aqueous solutions.

* * * * *